March 26, 1940.  H. W. DIETERT  2,194,891
GAS HOLDER FOR A PERMEABILITY METER
Filed May 24, 1937
FIG.1.
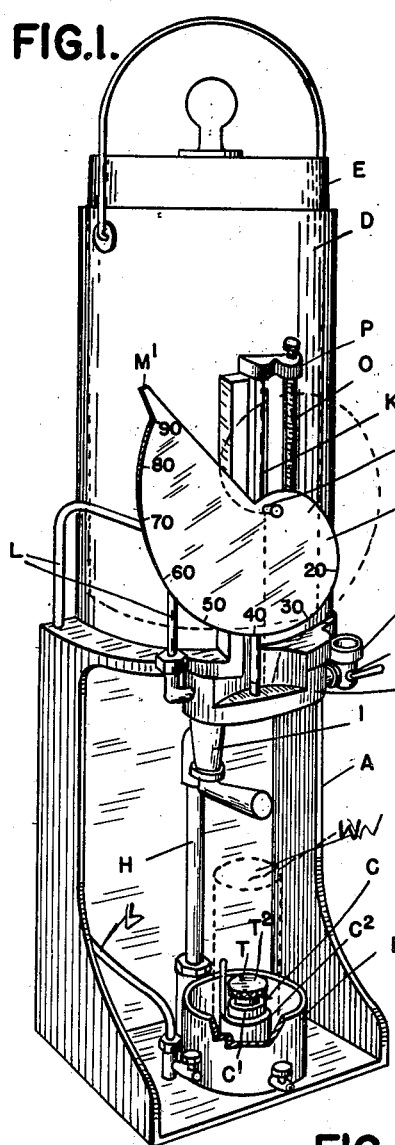
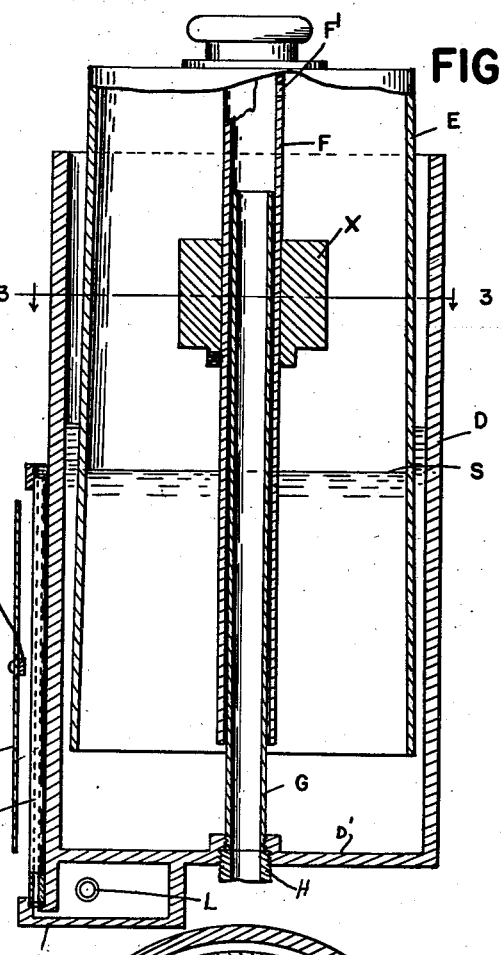
FIG.2.
FIG.4.
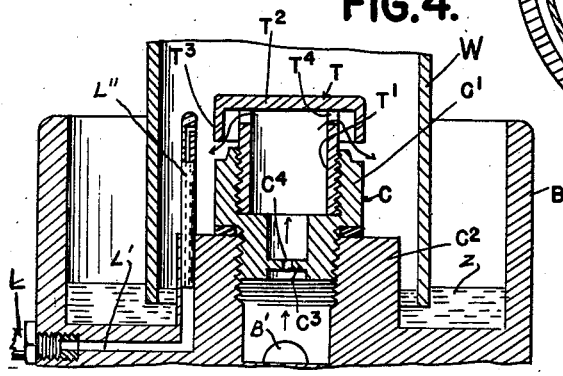
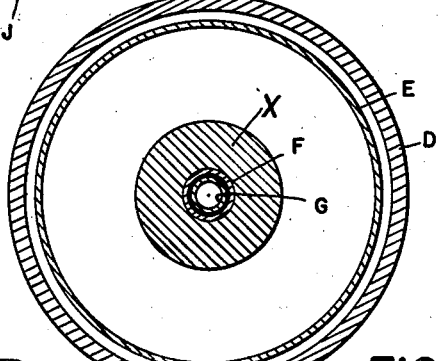
FIG.3.
INVENTOR
HARRY W. DIETERT
BY
ATTORNEYS Patented Mar. 26, 1940

2,194,891

UNITED STATES PATENT OFFICE 2,194,891

GAS HOLDER FOR A PERMEABILITY METER

Harry W. Dietert, Detroit, Mich.

Application May 24, 1937, Serial No. 144,537

4 Claims. (Cl. 48—176)

The invention relates to instruments of that type used in testing the porosity or permeability of sand used for forming molds and cores. Heretofore, instruments of that type have been made comprising a gasometer for placing a predetermined pressure upon a volume of air contained therein, a discharge connection between said gasometer and a base for sealing engagement with a tube containing the sand sample to be tested, and a gauge for indicating the pressure of air in said tube during the testing operation. The gasometer bell has also been provided with markings for indicating the distance it falls in any given interval of time, due to the escape of air through the sample, and there is further provided means for metering the discharge of air from the gasometer into the test tube, so that the indicated pressure of air in said tube will approximately determine the rate of escape through the sample.

The accuracy of the measurement by the instrument above described, is affected by a number of factors. Among these are: first, frictional resistance to the fall of the gasometer which alters the pressure upon the contained volume of air. Second, during the fall of the gasometer an increasing portion of the walls thereof will be submerged in the liquid seal, thereby diminishing the effective weight and consequently the pressure upon the contained air. Third, the metering means for discharge of air into the test tube is very sensitive and any obstruction, in the nature of dust, will alter the result.

It is the object of the present invention to correct some of these defects, thereby obtaining a greater accuracy of measurement, and to this end the invention consists in the construction as hereinafter set forth.

In the drawing:

Figure 1 is a perspective view of the instrument;

Figure 2 is a vertical central section through the gasometer;

Figure 3 is a horizontal section on line 3—3 of Figure 2;

Figure 4 is a vertical central section through the metering means and protective cap therefor.

As shown in Figure 1, A is a suitable frame having mounted on the base thereof the cup B for holding a mercury seal and having arranged centrally thereof the metering nozzle C. On top of the base A is the gasometer including the outer tank D and bell E. This bell has an axially extending guide tube F which engages a cooperating guide tube G forming the air discharge from the gasometer and extending downward to the base D' of the tank D. At the base D' of the tank the tube G is connected by a conduit H containing a valve or stop cock I with a passage B' the cup B connecting with the metering nozzle C. At the base D' of the outer tank D is a hollow block J forming a container for liquid, and a transparent gauge tube K, having its lower end submerged in the liquid of the cup, rises from the block outside of the tank. A tube L connected with an air space above the liquid in the block J extends therefrom to the cup B and communicates with the passage L' in the cup B connecting with an upright tube L'' in the cup. Mounted on the side of the tank is a scale M which is rotatable on a pivot N, the latter being vertically adjustable in position by a screw O engaging a bracket P. There is further a fill cup Q on the side of the hollow block J for placing water in the chamber therein, and a valve or stop cock R for closing the connection.

With the construction as thus far described, when the tank D is filled with water to a predetermined level, such as indicated by the dotted line S, the weight of the bell E, which is partially submerged in the water, will develop a predetermined pressure on the air contained therein. Whenever the valve I is opened the air from the bell will be discharged through a port F' into the upper end of the tubular guide F and through the guide tube G and conduit H to the passage B' in the cup B. Assuming that the sample to be tested is placed in a tube such as W which is engaged with the mercury seal Z in the cup B, the air discharged into this tube will gradually escape through the sand. The porosity or permeability of the sample is determined by the rate of flow through the sand which in turn is very accurately determined by the fall of the bell E in any given interval of time. Another test which can be more quickly made is by measuring the pressure in the tube below the sample. This is accomplished by the tubes L'' and L and passage L' which communicates the pressure of air in the sample tube W to the chamber in the hollow block J above the water therein, and which results in forcing water upward in the gauge tube K. By then turning the spiral scale M upon the pivot N until its periphery is at the height of the water in the gauge tube, the calibrations on the scale will indicate the permeability of the sample. Accuracy in this latter test is obtained by first vertically adjusting the pivot N for the scale M through the screw O, so that at atmospheric pressure its tip end M' will be at the exact height of the liquid in the gauge K.

The construction as above described has been heretofore used and my improvements relate to certain novel features as follows:

The pressure in the gasometer is determined by its effective weight in proportion to the area of the surface of the liquid which is in contact with the air. The effective weight is determined, first, by the absolute weight of the bell; second, by the amount of the walls thereof submerged in the liquid; and third, by the friction between the bell and its guiding means. With certain constructions heretofore used the bell has been weighted at the top thereof. This makes a very unstable structure which tends to tilt upon its guide, thereby increasing the frictional resistance to downward movement. Another construction heretofore used is where the bell is provided with an annular weight surrounding or attached to its outer wall. This necessitates very accurate forming of this annular weight for if one portion thereof is relatively heavier than another portion then there will be a tendency for the bell to tilt upon its guide with increase in friction. Another defect in this construction is that a tilting of the bell while raising the annular weight on one side will depress it on the opposite side so as to have little effect in raising the center of gravity. Therefore, there is not the inherent capacity for holding the bell with its axis exactly vertical.

With my improved construction, instead of placing the weight either on the top of the bell, or attaching it to the annular wall thereof as heretofore, I mount a weight X upon the depending axial guide tube F. This concentrates the mass nearer to the center of gravity and in the axis of the bell with the result, first, that it is less sensitive to slight variations in weight between one side and the opposite side of the axis. Second, it is in more stable equilibrium and tends to hold the bell from tipping. Another advantage of this construction is that the guide tube F which is attached to the bell surrounds the guide tube G which is attached to the stationary tank. This permits the water within the tank to rise between these tubes and to maintain the same constantly lubricated. The total effect is to obtain a higher degree of uniformity of air pressure within the bell at all times during the descent thereof.

As above stated, another cause of variation in pressure within the bell is due to an alteration in the effective weight occasioned by the submerging of a larger or smaller portion of the walls of the bell in the liquid in the container D. This I have compensated for by a slight variation in the cross sectional area of the bell from the lower portion thereof to the top, or at least between the limits of the portion which is alternately in and out of the liquid. It will be understood that with a given weight on the bell the pressure is proportional to the area of surface contact between the liquid and air. If, therefore, the inner cross sectional area is slightly diminished from a lower portion to an upper portion, this may be made to compensate for the decrease in effective weight due to a greater extent of submergence of the wall. Thus, as indicated in Figure 2, the wall of the bell is not exactly cylindrical but is slightly tapered from its lower to its upper end, the amount of taper being calculated to exactly compensate for varying submergence of the wall.

The metering device for the passage of air from the conduit H to the space within the test tube forms the subject-matter of my divisional application filed November 8, 1937, Serial No. 173,512, and preferably comprises a bushing C' which is screwed into a nipple $C^2$ in the cup B and is provided with a diaphragm $C^3$ having a very accurately calibrated orifice $C^4$ therethrough. To maintain this orifice at the exact dimension its wall is formed by a non-corrodible metal, such as gold plate, but this alone will not insure uniformity. Thus, a very slight amount of dust from the sand in the sample tested, if collected in the orifice, will alter the rate of flow of air therethrough. I guard against such a result by the provision of a cap T having a nipple portion T' for screwing into the bushing C' and an imperforate top $T^2$ extending radially outward and terminating in a down-turned annular flange $T^3$. The nipple portion T' has ports $T^4$ therethrough adjacent to the top wall $T^2$, thereby permitting flow of air from the orifice $C^4$ outward and into the test tube W. However, any dust which might be held in suspension in the air within the tube is prevented from access to the metering orifice $C^4$, inasmuch as this would necessitate passing upward within the annular flange $T^3$ against the direction of flow of air and then passing through the ports $T^4$ and downward within the nipple T'. I have found that the provision of the annular flange $T^3$ depending below the ports $T^4$ much more effectively guards against access of dust to the orifice $C^4$ than merely a horizontal flange above said ports.

What I claim as my invention is:

1. In a metering device, a gasometer including a liquid holding tank, a downwardly opening bell floating in said tank, a guide for said bell located substantially in the vertical axis thereof and including telescopically arranged members, the innermost member being tubular and forming an outlet for air from said bell, said innermost member being fixed at its lower end to the bottom of the tank, the outermost member being tubular and fixed at its upper end to the top of the bell, said outermost member being spaced from the innermost member sufficiently to permit water within the tank to rise between said telescopically arranged members and being provided near the top of the bell with a port for air from the interior of the bell, and an annular weight carried by said outermost tube and located beneath the closed top of said bell but above the highest liquid level in said bell.

2. In a metering device, a gasometer having a tank for liquid, a floating bell open at its bottom in said tank, telescoping guide tubes for said bell, one being secured within and movable with said bell relative to the other and having an opening through which air from the bell may flow to the other tube, and a weight sleeved upon the first mentioned tube adjacent said opening beneath the top of said bell, and above the highest liquid level in said bell.

3. In a metering device, a gasometer having a tank for liquid, a floating bell open at its bottom in said tank, telescoping guide tubes for said bell, one being fixed to the bottom of said tank, the second being fixed to the closed top of said bell, and a weight for said bell sleeved upon the second mentioned tube, at a point substantially beneath the closed top of said bell but above the highest liquid level in said bell.

4. In a metering device, a gasometer including a liquid-holding tank, a downwardly opening bell floating in said tank, a guide for said bell located substantially in the vertical axis thereof and including telescopically arranged members, the innermost member being tubular and forming an outlet for air from said bell, said innermost member being fixed at its lower end to the bottom of the tank, the outermost member being tubular and fixed at its upper end to the top of the bell, said outermost member being provided near the top of the bell with a port for air from the interior of the bell, and a weight for the bell sleeved upon the outermost member at a point beneath the top of the bell but above the highest liquid level in said bell.

HARRY W. DIETERT.